O. JACKSON.
BICYCLE STAND.
APPLICATION FILED FEB. 10, 1908. RENEWED OCT. 30, 1908.
924,074.
Patented June 8, 1909.
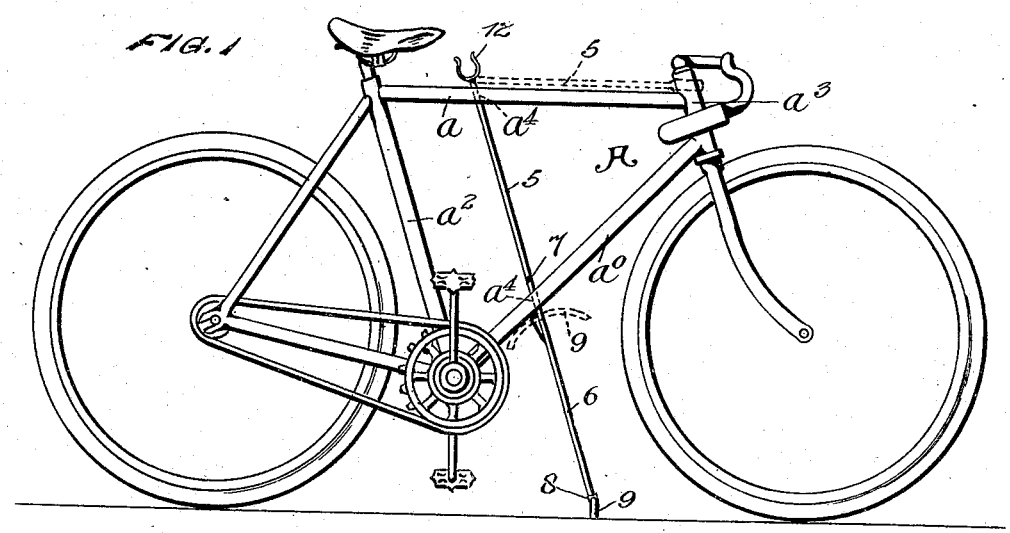
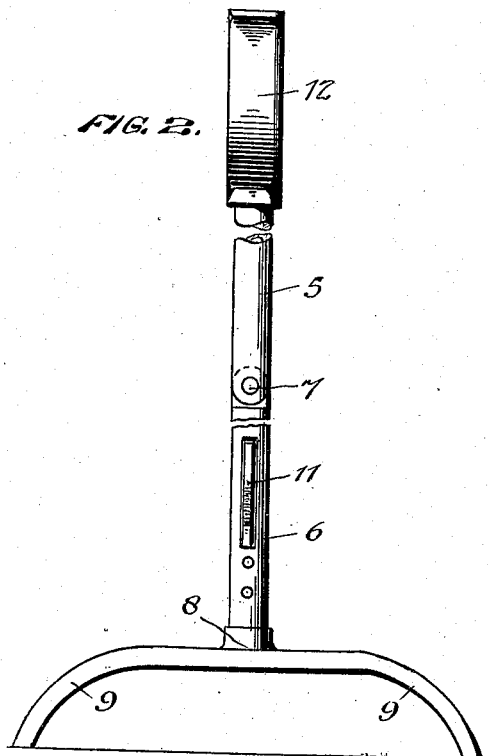
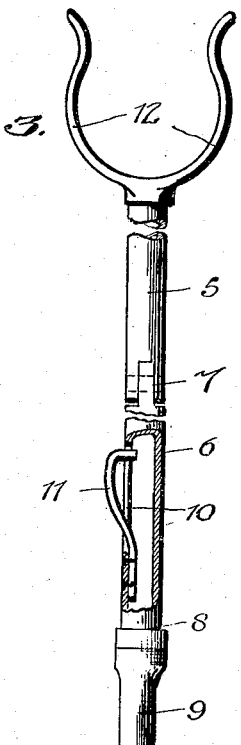
WITNESSES
INVENTOR
Owen Jackson,
By C. L. Parker
Attorney

UNITED STATES PATENT OFFICE.

OWEN JACKSON, OF DENVER, COLORADO.

BICYCLE-STAND.

No. 924,074.     Specification of Letters Patent.     Patented June 8, 1909.

Application filed February 10, 1908, Serial No. 415,241. Renewed October 30, 1908. Serial No. 460,273.

*To all whom it may concern:*

Be it known that I, OWEN JACKSON, citizen of the United States, residing at Denver, in the county of Denver and State of Colorado, have invented certain new and useful Improvements in Bicycle-Stands, of which the following is a specification.

My invention relates to stands for supporting bicycles in an upright position when not in use, and particularly contemplates the provision of a simple and inexpensive device which may be carried upon the bicycle and which may be readily and quickly actuated to a position to hold the same upright.

My invention further and specifically resides in the following features of construction, arrangement and operation, to be hereinafter described with reference to the accompanying drawings forming a part of this specification, in which like numerals are used to designate like parts throughout the several figures, and in which, Figure 1 is a view illustrating the practical application of my invention. Fig. 2 is a front elevation, on an enlaregd scale, of my improved bicycle stand detached, and Fig. 3 is a side elevation of the same.

In the practical embodiment of my invention, I provide a bicycle A with alined openings $a^4$ through its upper horizontal frame bar $a$, and lower slanting frame bar $a^0$, said openings being constructed substantially parallel with the central upright bar $a^2$, receiving the seat post. An elongated rod comprising upper and lower alined sections 5 and 6, having their adjacent ends hinged at 7, and slidably hinged through the alined openings in the frame bars $a$ and $a^0$ of the bicycle A. The rods 5 and 6 are of such combined length as to extend from a point slightly above the upper frame bar $a$ to a point adjacent the surface of the ground, when the bicycle A is in the upright position shown in Fig. 1, the lower of said rods being provided with a bracket 8 at its lower end, having curved spreading legs 9 adapted to rest upon the surface of the ground to form a suitable support for a bicycle. The lower rod 6 is further provided with a slot 10, and a spring member 11 secured therein and extending through said slot 10, and suitably arranged to engage beneath the lower slanting frame bar $a^0$ when the device is in the operative position as shown in Fig. 1, to prevent upward movement of my improved stand.

The upper end of the upper rod 5, which always remains above the upper frame bar $a$, is provided with an enlarged spring clip 12, adapted to engage about the head bar $a^3$, when my improved stand is not in use, in which position the rods 5 and 6 will be drawn upwardly through the openings $a^4$ in the frame bars $a$ and $a^0$ until the hinged connection 7 is above said upper bar $a$, in which position a rod 5 may be folded downwardly parallel with said upper bar $a$ to the position shown in dotted lines in Fig. 1.

From the foregoing it will be seen that I provide a bicycle stand which may be conveniently carried with the bicycle and which may be readily and quickly moved to its operative position to support the bicycle when it is desired.

Having fully described my invention, I claim:

In a bicycle prop of the character described, the combination with a bicycle frame comprising an upper horizontal bar, and a forwardly inclined lower bar which are provided with alined openings, of a pair of longitudinally alined rods hingedly connected at their adjacent ends between said bars, and slidably mounted through said openings, a bracket having spreading legs secured upon the lower end of the lower of said rods, a projecting spring member carried by said lower rod for engagement with said lower frame bar, and a spring clip carried by the upper end of said upper rod above said upper frame bar, said lower rod being of such length that said rods may be moved vertically through the said frame, until the hinge thereof extends above said upper frame bar, whereby the upper of said rods may be folded downwardly upon the upper frame bar, so that the said clip may engage the headed bar of the frame, substantially as described.

In testimony whereof I affix my signature in presence of two witnesses.

OWEN JACKSON.

Witnesses:
GEORGE C. SAMPLE,
JAMES M. MARTENIA.